March 28, 1961  W. O. GRUBE ET AL  2,976,786
CHARACTER FONT PLATE UNIT FOR PHOTOTYPOGRAPHICAL MACHINES
Filed Nov. 23, 1956  5 Sheets-Sheet 1
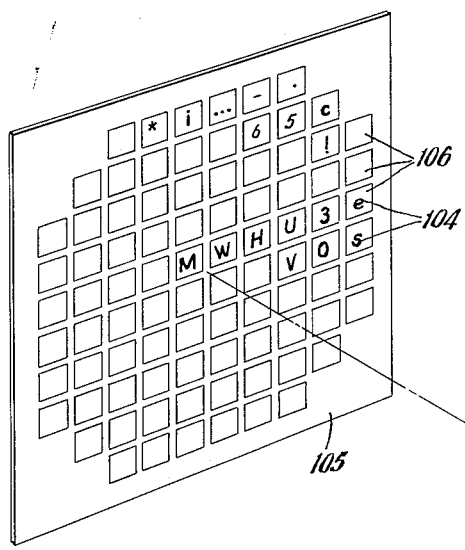
Fig. 1.
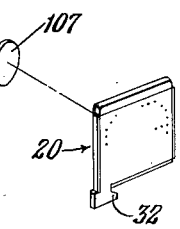
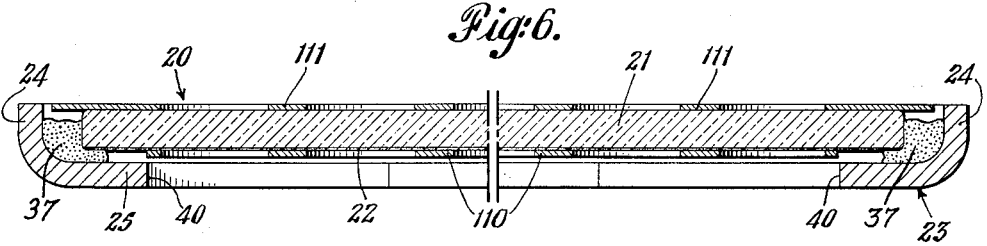
Fig. 6.
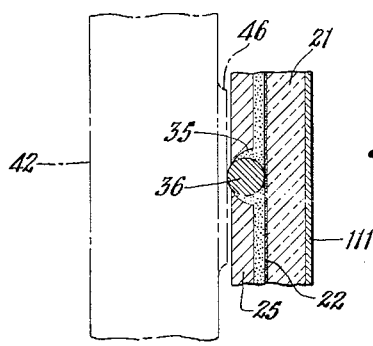
Fig. 7.
INVENTORS
WOLFGANG O. GRUBE
BY RICHARD K. WALKER
ATTORNEYS March 28, 1961  W. O. GRUBE ET AL  2,976,786
CHARACTER FONT PLATE UNIT FOR PHOTOTYPOGRAPHICAL MACHINES
Filed Nov. 23, 1956  5 Sheets-Sheet 2
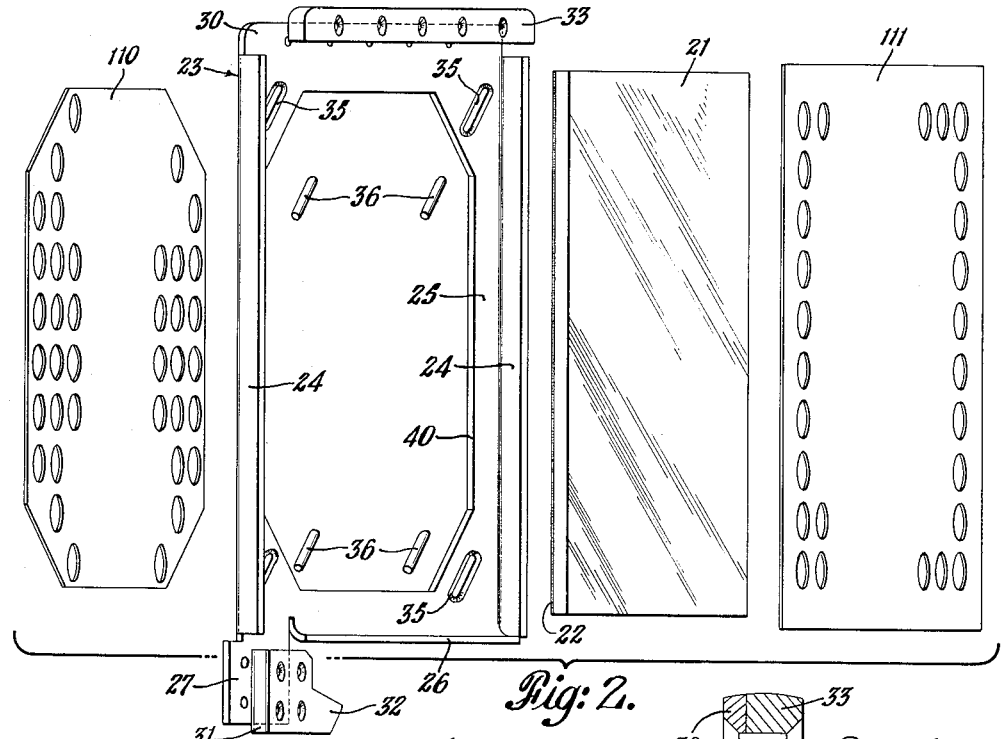
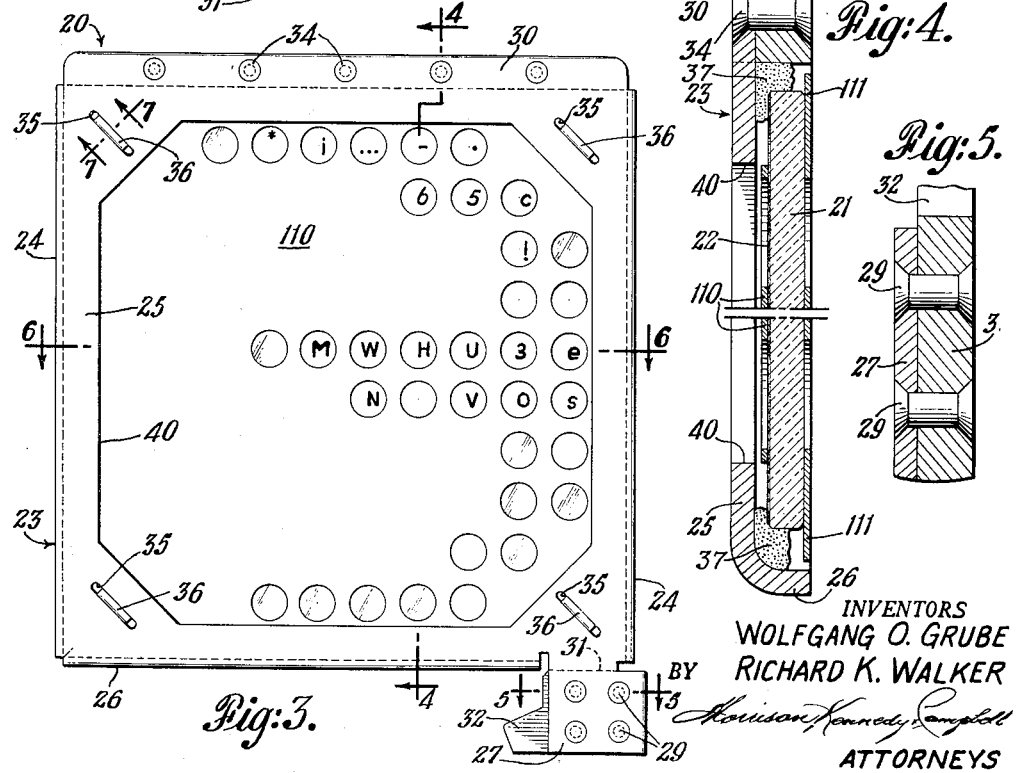
INVENTORS
WOLFGANG O. GRUBE
RICHARD K. WALKER
BY
ATTORNEYS March 28, 1961 W. O. GRUBE ET AL 2,976,786
CHARACTER FONT PLATE UNIT FOR PHOTOTYPOGRAPHICAL MACHINES
Filed Nov. 23, 1956 5 Sheets-Sheet 3

INVENTORS
WOLFGANG O. GRUBE
BY RICHARD K. WALKER
ATTORNEYS

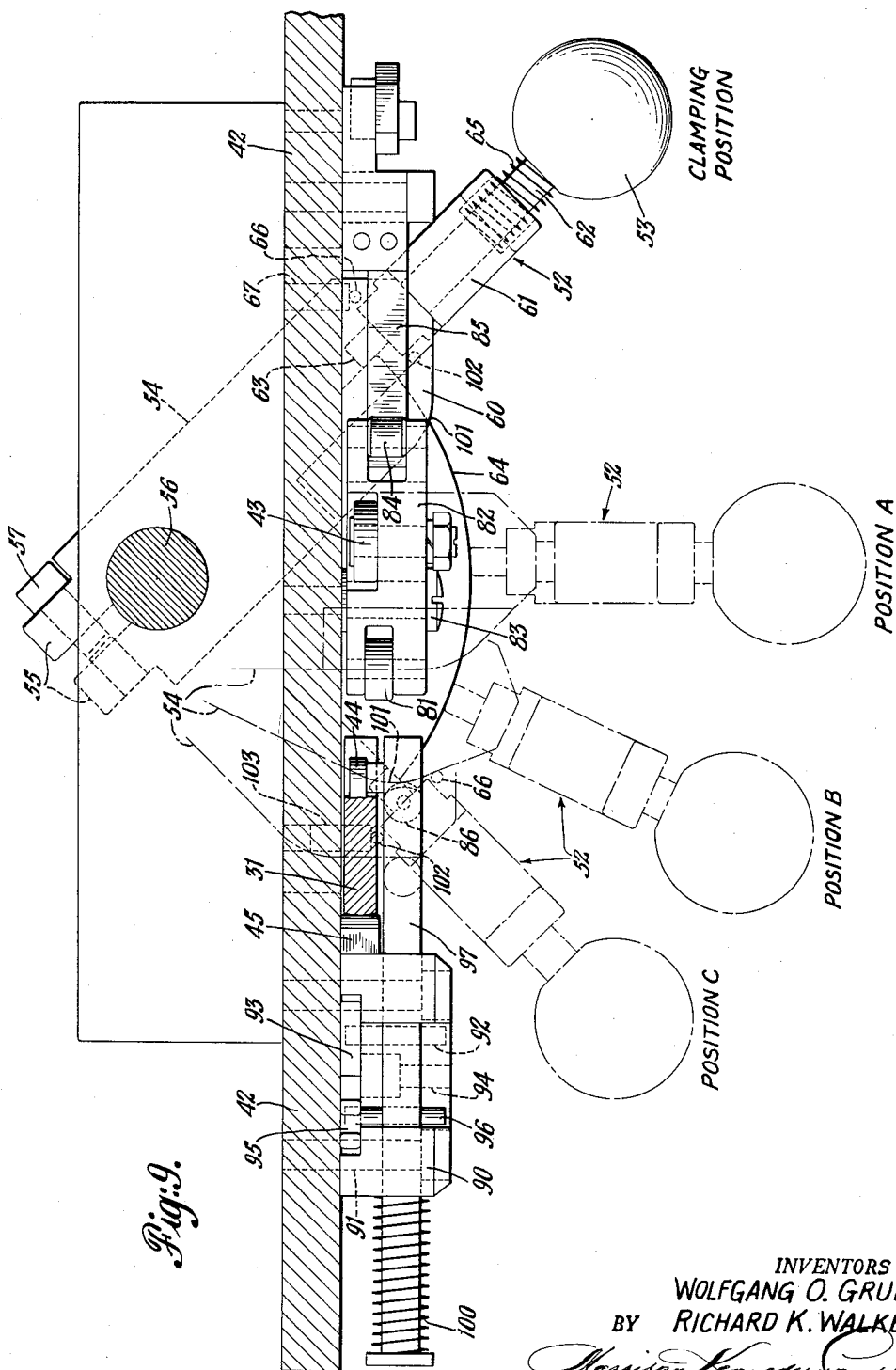

March 28, 1961 W. O. GRUBE ET AL 2,976,786
CHARACTER FONT PLATE UNIT FOR PHOTOTYPOGRAPHICAL MACHINES
Filed Nov. 23, 1956 5 Sheets-Sheet 5
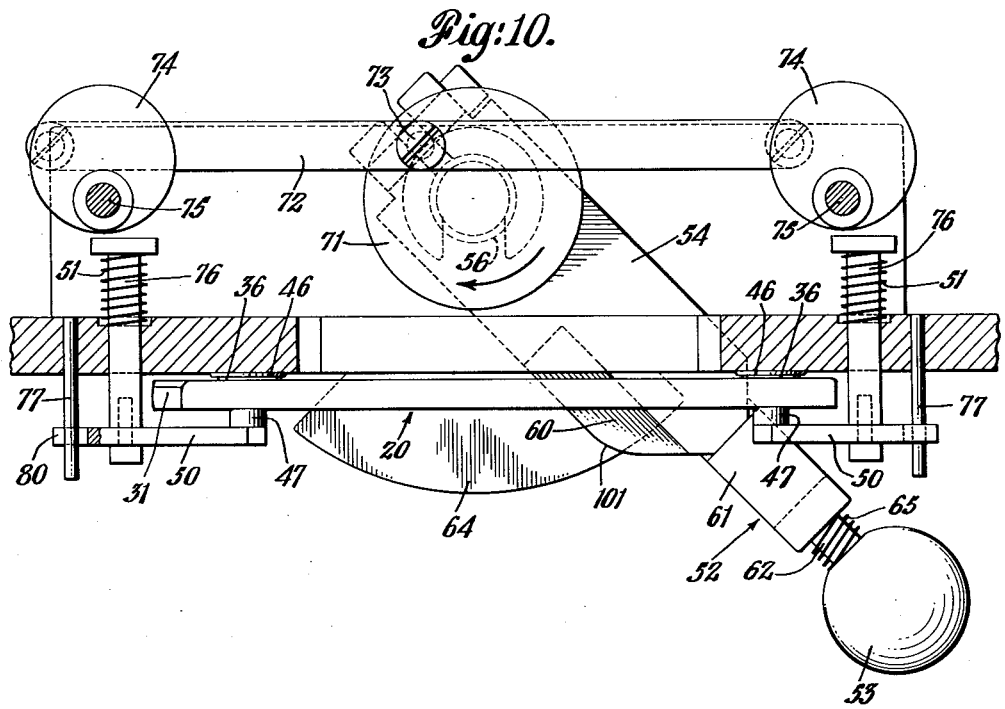
Fig:10.
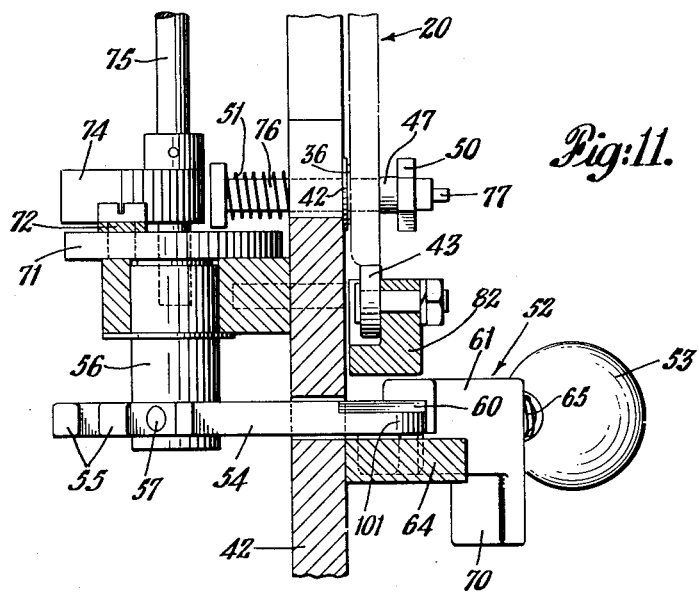
Fig:11.
INVENTORS
WOLFGANG O. GRUBE
BY RICHARD K. WALKER
ATTORNEYS

2,976,786

CHARACTER FONT PLATE UNIT FOR PHOTO-TYPOGRAPHICAL MACHINES

Wolfgang O. Grube, Leonia, and Richard K. Walker, Convent, N.J., assignors to Mergenthaler Linotype Company, a corporation of New York Filed Nov. 23, 1956, Ser. No. 624,135

3 Claims. (Cl. 95—4.5)

This invention relates to a character font plate unit for use in a phototypographical composing machine and more particularly to such a unit suitable for a phototypographical machine of the general organization shown in application Serial No. 419,012, filed March 26, 1954.

In a machine of the type therein described, a stationary font plate or film is provided having an array of transparent characters disposed on an opaque background. A light source to one side of the font plate serves to project light through the transparent characters. A shutter mechanism, interposed in the path of the projected light, is actuated to shut off light from all of the characters except the one selected for photographing. The light passing through the selected character then enters a collimating lenslet, individual to and associated with the particular character, which collimates the light defining character. Thereafter, the collimated light is focused by an imaging lens common to all of the characters. A point size changing lens system controls the size of the finally recorded character images, which are formed on a stationary film by a projection lens system mounted on a continuously moving line composing carriage.

It will be appreciated that the accuracy with which the character images are positioned on the sensitized sheet or film will in large measure be dependent on the accuracy with which they are formed on the font plate. Furthermore, since use of the machine involves the interchange of font plates, either to change the type face style or for other purposes, it is essential that the characters be formed on the font plate in a predetermined position having extremely minute deviation tolerances. Also, the font plate must be constructed so that when moved from a storage to an operating position in the machine, it will take a fixed position. In this manner, with the font plate in photographic position in the phototypographical machine, each character thereon will be in its prescribed position relative to the optical system of the machine to thereby assure requisite typographical accuracy.

In carrying out the invention, specifically, there is provided a glass plate having a photographic emulsion on one side thereof whereby character images are formed on the plate and said plate is secured in a mounting frame with its character bearing emulsion surface abutting a plurality of hardened precision spacer members which project through the mounting frame. The frame itself is provided with two wear resistant surfaces that serve as reference surfaces or edges for locating the character font plate unit in the photographic machine.

In manufacture, the glass plate having the photographic emulsion thereon is permanently secured in the mounting frame prior to exposure of the emulsion to the characters to be formed thereon. The edgewise positioning of the glass plate in the frame need not be accomplished with any great accuracy, it only being requisite that its fore-and-aft or facewise position within the frame be determined by the abutment of the emulsion surface of the plate with the precision spacer members. In order to photographically transform the emulsion to a character bearing surface, the glass plate is placed in the plate holder of a photographic apparatus with the wear resistant edges of the mounting frame abutting appropriate stops or locating devices provided in the plate holder. Thereafter, the emulsion surface is photographically exposed to a master character array and latent character images thereby formed on the emulsion. It will be clear that the images so formed on the glass plate will be precisely located with reference to the wear resistant edges of the mounting frame. The glass plate without being removed from its mounting frame, is then processed to fix the character images thereon, which images are preferably transparent against an opaque background.

It is readily apparent that, if the photocomposing machine in which the character font plate unit is to be used, is provided similarly with accurately located stops or abutments against which the unit can bear when brought into operative or photographic position, all of the characters on the glass plate will be fixed in a predetermined relationship relative to the machine, and particularly the optical components thereof, thereby assuring the accurate placement and alignment of the individual characters as they are photographed in side by side relationship for line composition.

Features and advantages of the present invention will be gained from the foregoing and the description of a preferred form thereof which follows:

In the drawings:

Fig. 1 is a schematic representation of the photographic apparatus utilized in the manufacture of the character font plate unit;

Fig. 2 is an exploded view of said unit;

Fig. 3 is a front elevational view of the unit;

Fig. 4 is a sectional view taken along line 4—4 of Fig. 3;

Fig. 5 is a sectional view taken along line 5—5 of Fig. 3;

Fig. 6 is a sectional view taken along line 6—6 of Fig. 3;

Fig. 7 is a sectional view taken along line 7—7 of Fig. 3;

Fig. 9 is a sectional view taken along line 9—9 of Fig. 8 and showing details of the mechanism for clamping the font plate unit in the plate holder;

Fig. 10 is a sectional view taken along line 10—10 of Fig. 8;

Fig. 11 is a sectional view taken along line 11—11 of Fig. 8; and

Figure 8:
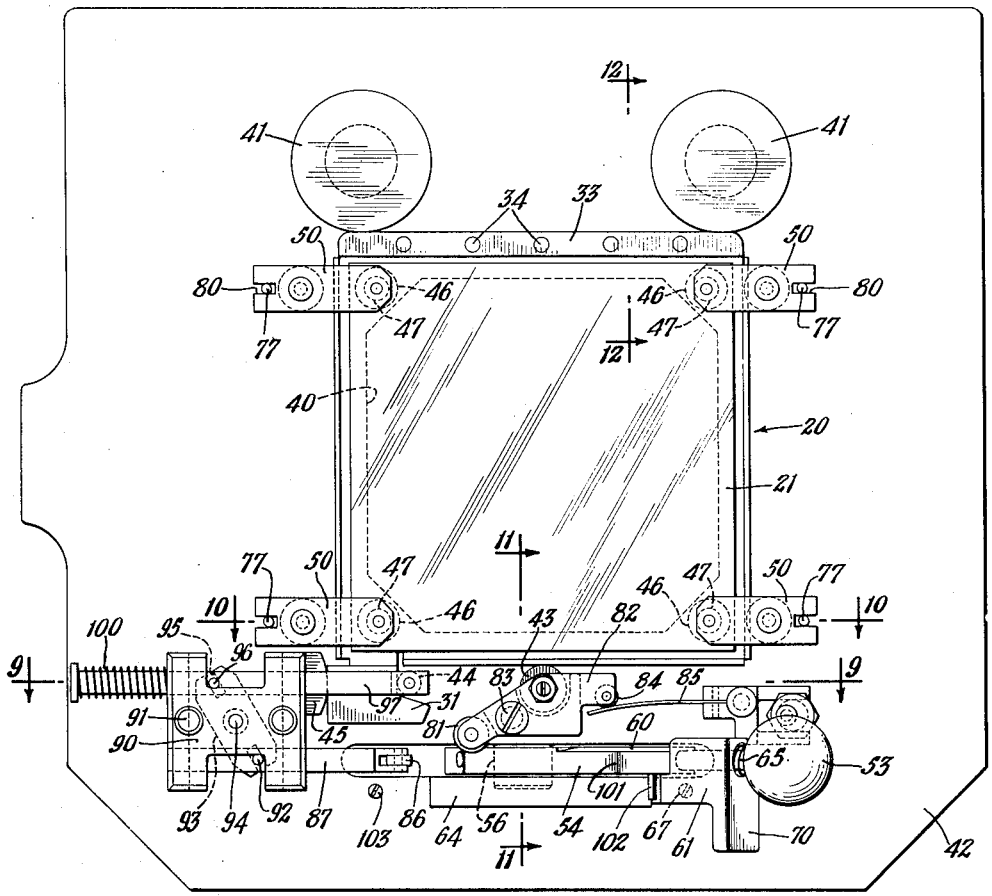
Fig. 8 is an elevational view of the plate holder of the photographic apparatus.
Figure 12:
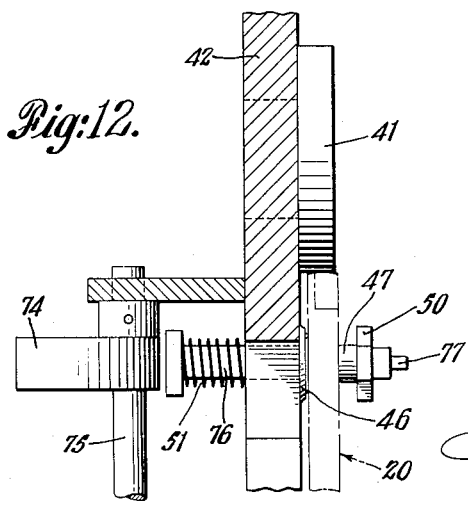
Fig. 12 is a sectional view taken along line 12—12 of Fig. 8.

Reference will first be made to Figs. 2 through 7, wherein the character font plate unit 20 is shown in detail. A rigid transparent plate 21, preferably glass, is provided as a support member for the photographic emulsion layer 22 on which the character images will finally appear. The emulsion possesses extremely high contrast orthochromatic anti-halation qualities. Kodak Kodalith Ortho Plates have been found quite satisfactory for the present application.

The rectangular mounting frame 23, in which the glass plate 21 is ultimately secured, is an apertured steel stamping, the side walls 24 of which are formed perpendicularly to the front wall 25 of the frame. The lower flange 26 of the frame, likewise, is formed perpendicular to the front wall 25, except for a depending tab portion 27 which is in the same plane as the front wall. The top portion 30 of the frame is merely an extension of front wall 25 beyond where the tops of the side walls are terminated. The distance that the side walls 24 and the lower flange 26 project from the inner surface of the frame preferably is about equal to the thickness of glass plate 21. In this manner, after the glass plate is secured in the frame, its edges will be protected against chipping or other damage which might result from careless handling.

Fastened to the downwardly projecting tab portion 27 of the frame, as by rivets 29, is a hardened steel member 31, having a lug 32 formed thereon. When fastened to the frame tab, member 31 in effect forms a hook, which, as will be seen hereinafter, aids in positioning the frame in the camera plate holder. An additional member 33, also of hardened steel construction, is fastened by rivets 34 or otherwise secured to the top portion 30 of the frame. In this latter instance, the member is of a length coextensive with the width of the frame. The thickness of the two members is such that the rear surfaces thereof are substantially in the same plane as the rear edges of the side walls and the lower flange 26. The reason for using hardened steel (although other hard, wear resistant materials might be satisfactorily used) is that, when the edge formed by member 33 and the outside edge of the hook formed by member 31 are machine finished, they serve as reference surfaces or edges which abut fixed stops in the camera and so determine the location of the characters photographed onto the glass plate. It will be noted that the bearing surfaces of the reference edges are provided with a slight curvature, for a recess which will be hereinafter considered. Also, when the character font plate unit is used in a photocomposing machine, these same reference surfaces accurately locate the unit relative to other machine components and, in particular, the optical elements.

In each corner of the mounting frame, there is provided a slot 35 which is of such dimension and shape as to accommodate a needle bearing 36 (see Fig. 7). The bearing is of a diameter greater than the thickness of the front wall of the mounting frame so that its bearing surface extends forwardly and rearwardly of said wall. While a needle bearing has been used, it does not serve a roller bearing function, but merely acts as a spacer member of precise dimensions.

The character font plate components are assembled, as by laying the needle bearings 36 in their respective slots 35 and then placing a blob of adhesive 37 in each corner of the frame. Armstrong Products, Inc. thermosetting adhesive, Type A3, has been found satisfactory in use, although other adhesives would undoubtedly be equally satisfactory. The glass plate 21 is then pressed into contact with the adhesive, emulsion side forward, until the plate is in contact with the four bearings 36 (Fig. 7). The edgewise positioning of the plate is unimportant since the plate is of greater dimensions than the front aperture 40 of frame 23 (Fig. 6). The adhesive is then injected around the entire circumference of the plate and allowed to air harden, this being made possible by the use of an activator mixed with the adhesive.

In this condition of assembly, the glass plate, or more precisely the emulsion, is ready for receiving the character images thereon in the camera. Consequently the mounting frame containing the glass plate is placed in the plate holder of a camera, as will now be described with reference to Figs. 8 through 12.

In the figures, the holder is shown in plate holding and clamping position and, therefore, the description will deal with the removal of a font plate unit from the holder. In Fig. 8, the unit is shown positioned with its top reference surface, formed by member 33, abutting fixed stops comprising disks 41 threaded into or otherwise fastened to a backing plate 42. A spring urged, lever-mounted roller 43 bears against the bottom edge of the font plate unit, thereby forcing it upwardly into abutting relationship with the two disk stops 41 and determining its vertical and horizontal position. The lower hook member 31 is shown grasped between a movable roller 44 and a fixedly positioned anvil 45. It is this latter arrangement which fixes the lateral or edgewise position of the font plate unit. It will be noted that each of the stops against which frame 23 abuts is provided with a curved abutment surface and, since the reference edges of the frame are themselves curved, a three point contact is obtained for locating the font plate unit. A similar arrangement is provided in the photographic machine to assure the same relative placement of the font plate unit.

The font plate unit is positioned in the focal plane of the camera by being clamped against four abutments 46, each of which is machined to provide an accurate facewise reference position in which the plate may be held, by pads 47 secured to clamped members 50. The members and the pads are urged to clamping position by compression springs 51. It will be noted (Fig. 7) that it is that portion of the needle bearings 36 projecting forwardly of the front wall 23 which determines the axial or facewise position of the unit with respect to the camera or photographic apparatus. Since the surfaces of abutments 46 will be fixedly located with respect to the camera, and the dimensions of the bearings are maintained with close tolerances, the emulsion layer on the glass plate will be accurately located with respect to the camera.

To remove a font plate unit which has been exposed to the character array, an operating lever 52 is moved in a clockwise direction as shown in Fig. 9. The lever comprises a handle or knob 53 integral with a shank 54 having at its remote end a pair of arms 55 which are clamped to a vertically disposed shaft 56, whereby the shaft may be rotated by the movement of the lever 52. A cap screw 57 is provided to cause the arms to securely grasp the shaft. The leading portion of the top side of the shank is provided with a tapered surface 60 which serves as a camming member, as later will be seen. A latching member 61 is slidable on a roll 62 joining knob 53 to shank 54 and is urged to latching position, wherein a projecting pin 63 is caught beyond the edge of an arcuately shaped member 64, by a compression spring 65. A pin 66, depending from shank 54, engages a set screw 67 adjustably positioned in backing plate 42 to limit the counterclockwise movement of the operating lever.

The latching member 61 is withdrawn from its latching position, as by exerting pressure on a finger grip portion 70 thereof and compressing spring 65 to permit movement of lever 52. As lever 52 is swung clockwise, shaft 56 (Figs. 10 and 11) is turned to rotate disk 71, fixed thereto, in a similar direction. A connecting link 72, which is rigidly fastened to the disk by screw 73, is caused to move generally in a rightward direction. Inasmuch as the extremities of link 72 are connected to camming members 74, which in turn are pivotally supported from shafts 75 for eccentric movement, the members 74 are caused to bear against the enlarged ends of sliding push rods 76. The rods are provided on their forward ends with the aforementioned slat members 50 carrying the bearing pads 47. Compression springs 51 normally urge the rods rearwardly and cause the pads 47 to clamp the font plate unit 20 as hereinabove indicated. A guide pin 77 extending through slot 80 formed in the end of each member 50 maintains said member in a horizontal position and prevents it from turning on rod 76. Thus, the initial clockwise movement of lever 52 results in pads 47 being removed from clamping engagement with the font plate unit to thus free the font plate from this clamping agency.

Further handle movement, as from "clamping position" (so marked) to "Position A" in Fig. 9, results in the camming surface 60 of shank 54 moving under a cam follower roller 81. The roller is pivotally supported at one extremity of lever 82 which is pivotally supported on the pivot pin 83. The other extremity of the lever is also provided with a roller 84 which is acted upon by a leaf spring 85. Intermediate roller 84 and the pivot pin is still another roller 43 (previously referred to) which bears against the underside of the font plate unit and supports it in a vertical position as determined by the stops 41. In their supporting position, lever 82 and roller 43 are under the influence of the leaf spring 85.

As lever movement continues from "Position A" and roller 81 rides up the cam surface 60 of shank 54, lever 82 is pivoted clockwise against the action of spring 85 and roller 43 is moved downwardly to remove the vertical support from the font plate unit. It thus remains only to free the hook located at the lower left hand corner of the font plate unit and this is accomplished by further movement of the handle.

In "Position B" (Fig. 9), the leading edge of shank 54 engages a horizontally disposed roller 86 pivotally secured to one end of push rod 87. The rod is supported in a guideway in block member 90 fastened to the backing plate 42 by screws 91 and is provided with a pin 92 extending therethrough. The pin extremities are positioned in the lower slotted yokes of lever 93 which is supported for pivotal movement on pin 94. The slots 95 in the upper end of lever 93 cooperate with a pin 96 extending through rod 97. This latter rod is also guided for reciprocal movement in a guideway in member 90, but it is urged to a clamping position by a compression spring 100. At its rightward end, it is provided with a projection carrying the aforementioned roller 44, which latter engages the hook of the font plate unit and clamps it in position against the fixedly positioned anvil 45 formed on member 90.

Returning again to consideration of the movement of lever 52, as the lever is pivoted from "Position B" to "Position C," the curved surface 101 of shank 54 bears against roller 86 to translate rod 87 leftwardly. Through lever 93, rod 97 is translated toward the right and roller 44 moves out of engagement with the hook on the font plate unit. As lever 52 sweeps over the arcuately shaped member 64, a spring 65, which is under compression during the font plate unit releasing movement, snaps the latching member 61 inwardly so that its pin 63 engages the edge of member 64. A pin 102, depending from shank 54, abuts the set screw 103 to limit the clockwise movement of the operating lever.

With the various clamping members released as described, an exposed font plate unit is removed, and an unexposed one slipped into place. As the handle is returned in a counterclockwise direction to the clamping position shown in the drawings, the various clamping actions are effected in an order reversed from that described above. That is, the first clamping action to take place is the last one to be released.

The photographic exposure of the inserted font plate unit takes place in a camera or photographic apparatus such as shown schematically in Fig. 1. The array of master characters 104 is disposed on a make-up board 105 and preferably each character in the array is provided on its own individual plate 106. In this manner, the precise location of each character can be effected. A lens system, represented by a single lens 107, is provided, to image the characters of the array onto the glass plate 21. Since, as has been demonstrated, the font plate unit has been precisely located in the plate holder, the characters will be imaged on the glass plate in an accurate predetermined position. Also, any number of font plate units can be manufactured from one setting of the characters on the make-up board and they will be standardized and completely interchangeable one with another.

After a font plate unit has been exposed, it is removed and the latent image thereon developed and fixed to provide a glass plate having transparent characters against an opaque background. Thereafter, an opaque apertured mask 110 is provided adhered to the front of the glass plate and a second opaque apertured mask 111 is provided on the reverse side of the glass plate. The masks serve a dual purpose in that they serve as a shield to prevent scratching or other damage to the glass plate or its fixed emulsion in the case of mask 110. Secondly, they serve to minimize the amount of opaqueing which would otherwise be required to insure an opaque background for the transparent characters.

The invention has been shown in preferred form and by way of example, and obviously many changes and variations may be made therein without departing from the spirit of the invention. It should be understood, therefore, that the invention is not limited to any specific form or embodiment except insofar as such limitations are specified in the appended claims.

What is claimed is:

1. As an article of manufacture, a character font plate unit for use in a photocomposing machine, said unit comprising a rigid glass plate having a plurality of light transmitting character images thereon against an opaque background, a single rectangular mounting frame in which the glass plate is immovably secured and having an opening which exposes all of the character images, said frame having a top horizontal reference edge for contact with a positioning element in the photocomposing machine, a tab depending from the lower edge of the frame at one corner thereof, a hook-shaped lug attached to said tab and presenting a vertical reference edge beyond the adjacent edge of the frame to contact with another positioning element in the photocomposing machine, and four needle bearing spacer elements disposed in diagonal slots cut through the front wall of the mounting frame at the four corners thereof and projecting beyond both the front and rear faces of said front wall, said needle bearing spacer elements being contacted by the front face of the glass plate and arranged for contact with still another positioning element in the photocomposing machine.

2. A character font plate unit according to claim 1, wherein the two reference edges and the four spacer elements locate the mounting frame in a precise stationary position in a camera by contact with positioning elements in the camera corresponding to those in the photocomposing machine.

3. As an article of manufacture, a character font plate unit for use in a photocomposing machine and adapted to be removably mounted in a stationary position in said machine as well as removably mounted in a stationary position in a camera, said unit comprising a flat rectangular glass plate having a photographic emulsion on one surface thereof, a single rectangular mounting frame in which the glass plate is immovably secured and having a rectangular opening to expose the emulsion surface, said mounting frame having three distinct reference means which contact three distinct positioning elements in the camera as well as three distinct positioning elements in the photocomposing machine, said reference means determining the precise position of said frame in lateral, transverse and longitudinal directions in the camera with respect to a master character array for the formation of latent images bearing fixed positions with respect to said reference means and said reference means also determining the precise position of the mounting frame in lateral, transverse and longitudinal directions in the photocomposing machine with respect to the optical elements thereof after the latent images have been developed and fixed on the glass plate while it remains immovably secured in the mounting frame, the glass plate of the finished unit having a plurality of light transmitting character images disposed thereon against an opaque background and occupying the same fixed positions with respect to the reference means on the mounting frame as do the latent images produced on the glass plate when the mounting frame is mounted in the camera.

References Cited in the file of this patent

UNITED STATES PATENTS 1,237,239    Bunnell ---------------- Aug. 14, 1917

(Other references on following page)

UNITED STATES PATENTS

| | | |
|---|---|---|
| 1,776,527 | Uher | Sept. 23, 1930 |
| 2,191,483 | Huggins | Feb. 27, 1940 |
| 2,229,689 | Westover | Jan. 28, 1941 |
| 2,229,690 | Westover | Jan. 28, 1941 |
| 2,241,263 | Koppe | May 6, 1941 |
| 2,336,489 | Litty | Dec. 14, 1943 |
| 2,388,961 | Elliott | Nov. 13, 1945 |
| 2,572,322 | De Goeij | Oct. 23, 1951 |
| 2,585,188 | Taylor | Feb. 12, 1952 |
| 2,701,991 | Croucher | Feb. 15, 1955 |
| 2,715,862 | Moyroud | Aug. 23, 1955 |